United States Patent [19]

Bressan et al.

[11] Patent Number: 5,525,680
[45] Date of Patent: Jun. 11, 1996

[54] CROSS-LINKABLE POLYMERIC COMPOSITIONS, PROCESS FOR THEIR PREPARATION AND MANUFACTURED ARTICLES OBTAINED THEREFROM

[75] Inventors: Giancarlo Bressan, Milan; Giancarlo Barbero, Arona; Claudio Troglia; Corrado Brichta, both of Milan, all of Italy

[73] Assignee: Enichem Augusta Industriale s.r.l., Milan, Italy

[21] Appl. No.: 738,439

[22] Filed: Jul. 31, 1991

[30] Foreign Application Priority Data

Aug. 3, 1990 [IT] Italy .................................. 21190/90

[51] Int. Cl.⁶ ........................... C08C 19/25; C08F 8/42; C08F 3/34
[52] U.S. Cl. ................. 525/342; 524/444; 524/450; 524/261; 524/264; 524/265; 526/194
[58] Field of Search ................. 525/342; 524/444, 524/450, 261, 264, 265; 526/194

[56] References Cited

U.S. PATENT DOCUMENTS

| | | | |
|---|---|---|---|
| 3,646,155 | 2/1972 | Scott | 260/827 |
| 4,518,731 | 5/1985 | Zamboni et al. | 524/166 |
| 4,529,750 | 7/1985 | Gimpel | 523/210 |
| 4,680,319 | 7/1987 | Gimpel et al. | 523/210 |
| 4,735,998 | 4/1988 | Itoh et al. | 525/342 |

FOREIGN PATENT DOCUMENTS 355553A  2/1990  European Pat. Off. ............ 524/450

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

Cross-linkable polymer compositions of an olefinic polymer modified by an unsaturated silane bearing hydrolyzable groups and a zeolite, wherein the zeolite is an adduct of a zeolite in finely divided form having a water content not higher than 3% by weight modified at a temperature of at least 150° C. with at least one carboxylic and/or sulfonic organic acid.

14 Claims, No Drawings

CROSS-LINKABLE POLYMERIC COMPOSITIONS, PROCESS FOR THEIR PREPARATION AND MANUFACTURED ARTICLES OBTAINED THEREFROM

The present invention relates to cross-linkable polymeric compositions, to the process for their preparation and to articles obtained therefrom.

More particularly, the present invention relates to compositions consisting of silanized polyolefins and reactive adducts of zeolites modified with organic acids, able to cross-link by essentially hydrolytic processes after or during the molding step.

According to the known technique, represented for instance by UK Patents 1,234,034 and 1,286,460 olefinic polymers modified by alkoxysilane groups can be cross-linked thus yielding —Si—O—Si— bonds among different chains by hydrolysis and condensation reactions of alkoxysilane groups in the chain.

Silanized polymers containing hydrolysable alkoxysilane groups are generally transformed, after addition of a silanolic condensation catalyst, in shaped articles by means of extrusion or other generally used thermoforming processes and thereafter these articles are subjected to cross-linking by exposure to water or vapour. However, this method is not suitable to produce cross-linked articles having a significant thickness, because of the slow diffusion inside the article of the water necessary to hydrolyse the alkoxysilane. This fact has limited the applications to insulation of high and middle voltage electric cables having thin thickness of cross-linked polymers.

A substantial improvment has been obtained according to processes described in U.S. Pat. Nos. 4,529,750 and 4,680,319.

In these patents the use is described of silanized polyolefinic compositions added with zeolites having a different content degree of water, with the purpose to accelerate the silanic cross-linking without causing the formation of blisters or porosities (caused by an excessive release of water) in the cross-linked manufactured article. Together with zeolite the use is also described of a cross-linking co-agent consisting of an arylcarboxylic or arylsulfonic acid optionally chemiadsorbed on the zeolite.

More particularly U.S. Pat. No. 4,680,319 describes the cross-linking of polyolefins grafted with hydrolyzable unsaturated silanes using as cross-linking agent a finely divided zeolite and as cross-linking co-agent the p-terbutylbenzoic acid, both added to the polymer before the extrusion.

After the end of the mixing step, the polymer is extruded and the obtained specimens are treated with hot water to initiate the cross-linking. At the end of the treatment specimens appear to be cross-linked with a cross-linking degree higher than 70%.

The Applicant have now found that if silanized polyolefins are added with a cross-linking agent consisting of an adduct of a zeolite treated at high temperature with a carboxylic or sulfonic organic acid, the already valuable results of the prior art can be further remarkably improved.

Therefore are object of the present invention cross-linkable polymeric compositions comprising an olefinic polymer modified by an unsaturated silane bearing hydrolyzable groups and an adduct consisting of a zeolite in finely divided form having a water content not higher than 3% by weight, modified by at least a carboxylic and/or sulfonic organic acid at temperature higher than 150° C.

By means of the polymeric compositions of the present invention, articles or shaped bodies can be prepared which cross-link within very short times using essentially non hydrolytic cross-linking processes.

Generally, results obtained are higher than those of the prior art because of the high cross-linking degree obtained by action of heat and/or irradiation by means of microwaves or infrared rays. Furthermore, the present compositions show a remarkable stability and do not undergo pre-crosslinking during the storage step at room temperature, thus allowing to put on the market a granulated product having a polycomponent granule.

The invention can also allow to reduce manufacturing times in common applications (for instance cables) and to broaden the range of industrial applications to articles having high thickness obtained by extrusion or injection moulding (for instance pipes for hot water, gasoline tanks, etc).

Polyolefins to which the present invention is applied are for example:

a) high, middle and low density polyethylene;

b) polypropylene;

c) copolymers of ethylene with propylene and/or different monoolefins (for instance butene-1, hexene-1);

d) thermoplastic rubbers consisting of ethylene-propylene copolymers or ethylene-propylene-diene terpolymers;

e) ethylene-vinylacetate and ethylene-acrylate copolymers.

Silanized polyolefins can be obtained according to widely known techniques based on the graft of an alkoxyvinylsilane in the polyolefinic chain, carried out in the presence of peroxides. Or alternatively, the silane is introduced by chemical reaction (esterification or transesterification) with carboxylic groups (or ester groups) introduced in the polyolefinic chain by copolymerization of the olefine with acrylic or methacrylic acid or esters of these acids. Silanized polymers can be also obtained, for instance, according to the process described in Published European Pat. Appln. 193 317, by copolymerizing the vinylsilane with the starting olefine.

Examples of silanes particularly suitable to produce silanized polyolefins are: vinyltrimethoxysilane, vinyltriethoxysilane, vinylmethyldimethoxysilane, vinyltriacetoxysilane, and gamma-methacryloxypropyl-trimethoxy-silane.

Further unsaturated alkoxysilanes, such as for instance alkoxyvinylsilanes (or acyloxyvinylsilanes), which can be used in the present invention are those commonly used in the silane cross-linking of polyolefins described in U.S. Pat. No. 3,646,155. In particular, suitable silanes are those of general formula $$R_nSi(-O-CH_2CHR''-OR')_{4-n} \qquad (I)$$

wherein:

n represents an integer equal to 1 or 2,

R' represents a $C_1$–$C_4$ alkyl group,

R" is H or $CH_3$;

R represents an unsaturated monovalent radical as described in the above mentioned U.S. Pat. No. 3,646,155.

Polyolefins grafted with these types of silanes are stable and can be cross-linked after molding according to the present invention.

Silanized polymers to be used in compositions according to the present invention have a silane content generally comprised between 1% and 10% by weight, preferably between 1.5% and 3%.

Zeolites used in compositions of the invention are aluminumsilicates of one or more alkaline or earth-alkaline metals, as described in D. Mreck "Zeolite molecular sieves" Wiley Interscience (1974) pages 133–180.

These zeolites correspond to the general formula $$Me_{2/x}.Al_2O_3.YSiO_2.zH_2O \quad (II)$$

wherein:
- Me is a metal, preferably an alkaline or earth-alkaline metal;
- x is the valence of the metal
- Y is the ratio $SiO_2/Al_2O_3$, which for a certain zeolite type may vary as follows:
  - Y=1.8–2.1 for zeolite A;
  - Y=2–3 for zeolite X
  - Y=3–6 for zeolite Y;
- z is the hydration degree of zeolite, which may vary from 0 to 9 according to the zeolite type.

The zeolite type to be used in compositions of the present invention falls in particular within the following classes:

i) synthetic zeolites of type A, corresponding to the formula $$Na_2O.Al_2O_3.2SiO_2.4,5H_2O$$

which is typical for zeolite 4A, wherein cation $Na^+$ can be substituted by cations $K^+$ (zeolite 3A) and $Ca^{++}$ (zeolite 5A);

ii) synthetic zeolites of the type X, corresponding to the typical formula:

$$Na_2O.Al_2O_3.2,4SiO_2.6H_2O$$

iii) synthetic zeolites of type Y, corresponding to the typical formula:

$$Na_2O.Al_2O_3.4,8SiO_2.8,9H_2O$$

of which also acid form $H^+Y$ can be used;

iv) zeolites of type P;

v) hydrosodalite represented by the formula $$Na_2O.Al_2O_3.2SiO_2.2,5H_2O$$

Obviously mixtures of the above mentioned zeolites can be used.

The above described zeolites when used in compositions of the present invention have a water content not higher than 3% by weight.

To perform the present compositions molecular sieves having zeolite structure can be used such as for instance aluminum phosphates, boroaluminumsilicates, etc. These products can be obtained for instance according to what described in Published European Patent Application 184 307 as well as in U.S. Pat. No. 4,385,994. It is also possible the use of natural zeolites, such as phillypsite, clinoptilite, nordenite, cabasite etc. and mixtures thereof.

The zeolite must have a suitable granulometry to allow a perfect dispersion in the polymer. Preferably, at least 80% by weight of the product must consist of particles with a size lower than 15 micrometers and preferably lower than 10 micrometers (measure carried out by means of the Coulter Counter apparatus).

In compositions according to the present invention, a zeolite selected from those above specified is modified by a carboxylic or sulfonic organic acid before being mixed with the silanized polymer.

Acids according to the present invention belong to classes of alkylcarboxylic, arylcarboxylic, alkylarylcarboxylic, arylsulfonic acids wherein the hydrocarbon radical contains from 1 to 20 C. Among these acids the preferred ones are those endowed with a chemico-physical behaviour compatible with the conditions of process for the preparation of adducts which foresee the direct interaction of the two components at temperatures comprised between 150° and 350° C. The acid is preferably in the molten state without being subjected to sublimation and decarboxylation phenomena. Therefore the following acids appear to be preferred for the purposes of the present invention: p-terbutylbenzoic acid, p-toluic acid, alpha- and beta-naphthoic acid, phthalic acid, benzoic acid, methoxy- and ethoxy-benzoic acid, salicilic acid, toluensulfonic acid, adipic acid and alpha- and beta-naphthalensulfonic acid.

During the preparation of the adduct the hydration water of zeolite is removed, thus obtaining a substantially anhydrous product, characterized by an acid content comprised between 2 and 30% (preferably between 5 and 20%) by weight.

The presence of restricted residue concentrations of water (up to 3%) is allowed and does not affect substantially the cross-linking results according to the present invention; in fact the cross-linking is essentially of non hydrolytic type at these hydration levels in that water, under the working conditions chosen is strongly associated to the zeolite matrix and the action of the organic component remains prevailing.

Compositions of the present invention can be transformed into cross-linkable articles using whatever transformation technique known in the art, for instance extrusion, injection molding, compression molding and "blow moding".

A process for he preparation of polymeric compositions of the present invention comprises:

1. mixing an olefinic polymer modified by an unsaturated silane bearing hydrolyzable grousps with an adduct consisting of a zeolite in finely divided form, having a water content not higher than 3% by weight and modified by at least one carboxylic and/or sulfonic acid at temperature higher than 150° C.; and
2. extruding in granules the thus obtained mixture.

According to an alternative the zeolite adduct can be used in form of masterbatch, consisting of a base polymer compatible with the silanized polyolefin, containing a high adduct concentration. This masterbatch is mixed with the silanized polymer and the homogeneous mixture is used in the subsequent transformation operations.

According to a further alternative the mixture prepared according to the first step of the present invention can be directly used in the preparation of articles to be cross-linked.

The concentration of the zeolite-organic acid adduct in the final mixture is determined according to the working conditions of the cross-linking process and is comprised between 1 and 25% (preferably between 5 and 10%) by weight.

The composition to be subjected to cross-linkung according to the present invention may contain also a catalyst of the type generally used for the silanolic condensation such as for instance tin dibutyldilaurate and tetrabutyltitanate, in amount from 0.05 to 1% by weight. However, this addition is not absolutely necessary, in that the cross-linking process is assured by interactions between alkoxysilane groups of the polymer and the organic acid associated to the zeolitic surface.

The cross-linking step of molded articles can be performed by different processes, which may be summarized as follows:

a) thermomolding and cross-linking obtained in a single working step, according to the modalities described in Published European Patent Application 355,553;

b) thermoforming and cross-linking carried out in two separate working steps.

With particular reference to the process specified under b), articles formed according to known processes for instance extrusion or moulding, are subjected to cross-linking by one of the following methods:

b 1. irradiation by microwaves having a frequency from $10^9$ to $10^{12}$ Hz, optionally after pre-heating according to what described for instance in published European Patent Application 149,782;

b 2. treatment in hot-air or infrared rays furnace;

b 3. exposure to moisture in form of water vapor or damp gases.

Articles molded with compositions of the present invention show a cross-linking degree higher than 70% and ultimate tensile strength higher than 0.2 MPa, generally between 0.25 and 0.5 MPa, according to ASTM D 412.

In order to better understand the present invention and to practically perform the same, some illustrative but not limitative examples are reported hereinafter.

EXAMPLE 1 (COMPARISON)

In a drum-tilter the following components in granulated form are mixed:

a) 70 parts by weight of ethylene vinyltrimethoxysilane copolymer having a silane content equal to 1.5%;

b) 20 parts by weight of masterbatch containing 50% of zeolite 4A (Merilit B of AUSIDET Society) dehydrated up to a 0.5% by weight water content and 50% of polyethylene Riblene CF2 product of Enimont Society—Milano having a melt flow index equal to 1.8 dg/min (190° C./21.6N) according to ASTM D 1238;

c) 10 parts of a masterbatch containing 15% of p-ter.butylbenzoic acid and 85% of Riblene CF2.

The mixture a)+b)+c) is fed into a monoscrew extruder for polyethylene having L/D=22, diameter=45 mm, 30 rpm, with a compression ratio 3:1 and is extruded at 160° C. to give a band having thickness 4 mm and width 25 min.

A sample of the manufactured article is subjected to tensile tests at 200° C. according to the ASTM D 412 method. The breaking stress ($\sigma_R$) is 0.01 MPa and the ultimate elongation ($\epsilon_R$) is higher than 300%. Data relating to the mechanical resistance show that the sample is very weakly cross-linked in the extrusion step.

Another sample of band extruded as above specified is irradiated for 7 min. by means of microwaves having the frequency of 2450 MHz with a power of the generator equal to 1500 W. Mechanical characteristics show an advancement of the cross-linking, $\sigma_R=0.1$ MPa $\epsilon_R=200\%$ The compression moulding at 250° C. for 5 min, carried out in a hot-plates press, gives the following characteristics of the molded sheet:

$\sigma_R=0.15$; $\epsilon_R=300\%$

EXAMPLE 2

In a stainlesssteel reactor, equipped with rotating blade agitator and heater, there are introduced 600 parts by weight of sodium zeolite 4A, marketed by AUSIDET Society of Milano under the tradename Merilit B, previously dehydrated separately by a treatment in a muffle furnace for 1 hour at 450° C. The reactor is agitated and at 180° C. 100 parts by weight of p.tert.butylbenzoic acid (TBBA) are added, by carrying out the addition gradually on the moving zeolite bed. The whole is left agitating for 30 minutes at 180° C. and thereafter the heating is stopped.

The reactor is discharged and the reaction product is analyzed to determine the content of organic derivative and water. According to the carbon-hydrogen elemental analysis the finished product appears to be consisting of a zeolite adduct containing 0.4% water and 13.9% TBBA, partially present as sodium salt.

500 parts by weight of the zeolite adduct thus obtained in form of fine powder are mixed with 500 parts by weight of granulated polyethylene Riblene CF2 having density=0.919 and melt flow index equal to 1.8 dg/min (190° C./21.6N) according to ASTM D 1238. The mixture is introduced into a mixer of the Banbury type at 170° C. and the resulting homogeneous product is reduced to sheets by calendering at 110°-120° C. and finally is crumbled in a blade mill. By this way a masterbatch is obtained containing 50% of the zeolite TBBA adduct having the lowest water content (lower than 0.5%) which will be used in subsequent specified tests.

In a drum-tilter the following components in granulated form are mixed:

a) 60 parts by weight of ethylene-vinyltrimethoxysilane having a 1.5 silane content;

b) 40 parts by weight of the masterbatch containing 50% of the zeolite-TBBA adduct prepared according to the above described modalities.

The granular mixture of a)+b) is fed to the monoscrew extruder described in example 1 at the temperature of 160° C. thus obtaining the same type of band.

On a specimen of this band the behaviour stress/deformation at 200° C. is determined (ASTM D 412-DIEC method) and the following values are obtained:

breaking stress ($\sigma_R$): 0.25 MPa ultimate elongation ($\epsilon_R$): 90% modulus of the secant at 40% elongation ($E_{40}$): 0.35 MPa

On another specimen the tensile strength in warm is measured by the "hot set" method (IEC 502/540 at 200° C./20N/15 min). The tensile elongation is 40% and the permanent deformation is 22%.

The behaviour in mechanical tests shows that the extruded product is cross-linked and the cross-linking process occurred during the extrusion step.

Specimens of extruded band were subjected to irradiation for 16 minutes by means of microwaves at the frequency of 2450 MHz by a 1000 W generator power, after pre-heating with hot air at 180° C. Final data relating to stress/deformation characteristics at 200° C. are as follows (according to ASTM D 412-DIEC):

$\sigma_R$ 0.49 MPa; $\epsilon_R$ 35%; $E_{40}$ 1.84 MPa

These data show the further remarkable advancement of the cross-linking.

EXAMPLE 3

In a drum-tilter the following components in granular form are mixed:

a) 80 parts by weight of the ethylene-vinyltrimethoxysilane copolymer described in example 2;

b) 20 parts by weight of the masterbatch containing 50% of the zeolite-TBBA adduct prepared according to the modalities of example 2.

The granular mixture of a)+b) is fed to the extruder of the example 2 the head temperature of which is 200° C.

Many specimens of the extruded band give the following average stress/deformation data, according to the method indicated in example 2:

$\sigma_R$=0.05 MPa; $\epsilon_R$=200%; $E_{40}$=0.03 MPa

The manufactured article is therefore weakly cross-linked during the extrusion step.

Subsequent irradiation by means of microwaves, under condition of example 2, gives the following machanical characteristics at 200° C. (according to ASTM D412):

$\sigma_R$=0.34 MPa; $\epsilon_R$=70%; $E_{40}$=0.58 MPa due to further cross-linking.

Other specimen of the extruded manufactured article are kept in water at 80° C., for 8 hours; the cross-linking occurs and gives the following values determined according to the same method:

$\sigma_R$=0.29 MPA; $\epsilon_R$=110%; $E_{40}$=0.35 MPa

EXAMPLE 4

The following components in granulated form are mixed:

a) 80 parts by weight of the ethylene-vinyltrimethoxysilane having a silane content equal to 1.1%;

b) 20 parts by weight of the masterbatch containing 50% of the zeolite-TBBA adduct prepared according to the modalities of example 2.

The granulated mixture a)+b) is fed to the extruder of example 2 the head temperature of which is 175° C.

The extruded band shows the following mechanical characteristics at 200° C. (according to ASTM D 412):

$\sigma_R$=0.04 MPa; $\epsilon_R$=300%; $E_{40}$=0.02 MPa

A specimen of the extruded manufactured article is preheated at 95° C. and subjected to irradiation by means of microwaves for 6 minutes (frequency 2450 MHz; power 1500 W); the inner temperature of the specimen, determined by means of a thermocouple, quickly raises to 210° C. and the cross-linking occurs giving the following stress/deformation values measured by the above specified method:

$\sigma_R$=0.2 MPa; $\epsilon_R$=150%

Another sample of the extruded manufactured article is subjected to compression moulding at 250° C. for 5 minutes in a press provided with heated plates; the following values of mechanical characteristics of the molded sheet are obtained:

$\sigma_R$=0.27 MPa; $\epsilon_R$=50% measured by the same method.

EXAMPLE 5

A homogeneous mixture of the following granulated components is prepared:

a) 80 parts by weight of the ethylene-vinyltrimethoxysilane copolymer described in example 2;

b) 20 parts by weight of the masterbatch containing 50% of the zeolite-TBBA adduct prepared according to the modalities of example 2.

The granulated mixture of a)+b) is fed to the extruder of example 2 the head temperature of which is 160° C.

Many specimen of the extruded band give the following stress/deformation data according to the method indicated in example 2:

$\sigma_R$=0.025 MPa; $\epsilon_R$=400%

A treatment in infrared ray furnace with 5 minutes of exposure at 230°–250° C. allows the further cross-linking, indicated by the following values:

$\sigma_R$=0.28 MPa; $\epsilon_R$=90%

EXAMPLE 6

In the stainless steel reactor described in example 2, 600 parts by weight of sodium zeolite 4A (Merilit B of AUSIDET Society) are introduced; the product is heated to 300° C. and this temperature is kept for about two hours under a nitrogen stream. Thereafter, 100 parts by weight of p.tert.-butylbenzoic acid (TBBA) are slowly added, while maintaining the agitation in warm (180°–200° C.) for further 30 minutes. The heating is stopped and the reactor is discharged. The analysis of the reaction product, carried out as described in example 2, indicates that the zeolite adduct obtained contains 16% of TBBA and 3% of water.

The following components in granulated form are mixed:

a) 90 parts by weight of the ethylene-vinyltrimethoxysilane copolymer of the type used in example 4;

b) 10 parts by weight of the masterbatch containing 50% of the zeolite-TBBA adduct above described.

The granulated mixture of a)+b) extruded at 160° C. The data relating to mechanical characteristics of the extruded product are as follows:

$\sigma_R$=0.05 MPa; $\epsilon_R$=200%

After microwaves exposure, according to the process of example 2, the following results:

$\sigma_R$=0.2 MPa; $\epsilon_R$=150% are obtained.

EXAMPLE 7

A zeolite-benzoic acid adduct is prepared by working under the conditions indicated in example 2, from 500 parts by weight of dehydrated sodium zeolite 4A and 70 parts by weight of benzoic acid. After dehydration of the zeolite (see example 2), the addition of benzoic acid is carried out at 150° C. The finished product contains 12% of benzoic acid and 0.6% of water.

The following components in granulated form are mixed:

a) 80 parts by weight of the ethylene-vinyltrimethoxysilane copolymer of the type used in example 2;

b) 20 parts by weight of the masterbatch containing 50% of the zeolite-benzoic acid adduct above indicated.

The granulated mixture of a)+b) is extruded at 190° C. according to the modalities indicated in example 2.

Many specimens of the extruded band give the following average stress/deformation data, according to the method of example 2:

$\sigma_R$=0.04 MPa; $\epsilon_R$=250%; $E_{40}$=0.03 MPa

The subsequent irradiation by means of microwaves, according to the process of example 2, give the following thermechanical characteristics:

$\sigma_R$=0.32 MPa; $\epsilon_R$=110%; $E_{40}$=0.29 MPa

We claim:

1. In a cross-linkable polymeric compositions comprising an olefinic polymer modified by an unsaturated silane bearing hydrolyzable groups and a zeolite, the improvement wherein the zeolite is an adduct consisting of a zeolite in finely divided form having a water content not higher than 3% by weight modified at a temperature of at least 150° C. with at least one carboxylic and/or sulfonic organic acid.

2. Compositions according to claim 1, wherein the olefinic polymer is selected from:
   a) high, middle, low density polyethylene;
   b) polypropylene;
   c) copolymers of ethylene with propylene and or different monoolefins;
   d) thermoplastic rubbers consisting of ethylene-propylene copolymers or ethylene-propylene-acrylate-diene terpolymers; or
   e) ethylene-vinylacetate and ethylene-acrylate copolymers.

3. Compositions according to claim 1, wherein unsaturated silanes modifying the olefinic polymer are selected from: vinyltrimethoxysilane, vinyltriethoxysilane, vinylmethyldimethoxysilane, vinyltriacetoxysilane or gamma-methacryloxy-propyl-trimethoxy-silane.

4. Compositions according to claim 1, wherein the olefinic polymer is selected from:
   a) high, middle, low density polyethylene;
   b) polypropylene;
   c) copolymers of ethylene with propylene and or different monoolefins;
   d) thermoplastic rubbers consisting of ethylene-propylene copolymers or ethylene-propylene-acrylate-diene terpolymers; or
   e) ethylene-vinylacetate and ethylene-acrylate copolymers and wherein unsaturated silanes modifying the olefinic polymer are selected from: vinyltrimethoxysilane, vinyltriethoxysilane, vinylmethyldimethoxysilane, vinyltriacetoxysilane or gamma-methacryloxy-propyl-trimethoxy-silane.

5. Compositions according to anyone of claims 1 to 3 and 4, wherein the olefinic polymer has a silane content between 1% and 10% by weight.

6. Compositions according to anyone of claims 1 to 3 and 4, wherein the zeolites are aluminasilicates of one or more alkaline or alkaline-earth metals of the general formula:

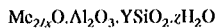
$$Me_{2/x}O.Al_2O_3.YSiO_2.zH_2O \qquad (III)$$

wherein:

Me is a metal;

x is the valence of the metal;

Y is the ratio $SiO_2/Al_2O_3$ comprised between:
   1.8 and 2.1 for zeolite A;
   2 and 3 for zeolite X;
   3 and 6 for zeolite Y;

z is the hydration degree of the zeolite being between 0 and 9.

7. Compositions according to claim 6, wherein M is an alkaline or alkaline-earth metal.

8. Compositions according to anyone of claims 1 to 3 and 4, wherein at least 80% by weight of zeolites consists of particles having a size smaller than 15 micrometers.

9. Compositions according to anyone of claims 1 to 3 and 4, wherein the carboxylic or sulfonic organic acid is selected from alkylcarboxylic, arylcarboxylic, alkylaryl carboxylic or arylsulfonic acids wherein the hydrocarbon radical contains from 1 to 20 C atoms.

10. Compositions according to anyone of claims 1 to 3 and 4, wherein the zeolite is modified with the carboxylic or sulfonic organic acid at temperatures between 150° and 350° C.

11. Compositions according to anyone of claims 1 to 3 and 4, wherein the adduct has an acid content, between 2 and 30% by weight.

12. Process for the preparation of polymeric compositions of anyone of claims 1 to 3 and 4, comprising:
   1. mixing an olefinic polymer modified by an unsaturated silane bearing hydrolyzable groups with an adduct consisting of a zeolite in finely divided form having a water content not higher than 3% by weight, modified at a temperature of at least 150° C. with at least one carboxylic and/or sulfonic acid; and
   2. extruding into granules the thus obtained mixture.

13. Process according to claim 10, wherein the concentration of adduct in the finished mixture is between 1 and 25% by weight.

14. Molded articles of the compositions of anyone of claims 1 to 3 and 13 having a cross-linking degree higher than 70% and ultimate tensile strength over 0.2 MPa according to ASTM D 412.

* * * * *